United States Patent [19]

Kalan et al.

[11] 4,350,345
[45] Sep. 21, 1982

[54] AIR-SEALED OIL DEFLECTOR

[75] Inventors: Gary L. Kalan, Clifton Park; Peter G. Ipsen, Schenectady, both of N.Y.

[73] Assignee: General Electric Company, Schenectady, N.Y.

[21] Appl. No.: 249,781

[22] Filed: Apr. 1, 1981

[51] Int. Cl.³ .................. F16J 15/40; F16J 15/44
[52] U.S. Cl. .................. 277/3; 277/15; 277/19; 277/53; 277/72 R
[58] Field of Search .......... 277/3, 15, 53, 19, 59, 277/70, 71, 72 R, 72 FM

[56] References Cited

U.S. PATENT DOCUMENTS

| | | | |
|---|---|---|---|
| 978,399 | 12/1910 | Rotter | 277/53 X |
| 1,188,189 | 6/1916 | Little | 277/53 X |
| 1,425,548 | 8/1922 | Schmidt | 277/53 X |
| 1,779,076 | 10/1930 | Ray | 277/53 X |
| 1,938,492 | 12/1933 | Moller | 277/3 X |
| 3,614,112 | 10/1971 | Herzog et al. | 277/19 |
| 3,971,563 | 7/1976 | Sugimura | 277/59 X |

FOREIGN PATENT DOCUMENTS 613963  2/1961  Canada ................. 277/53

*Primary Examiner*—Robert S. Ward, Jr.
*Attorney, Agent, or Firm*—Ormand R. Austin; John F. Ahern

[57] ABSTRACT

An air-sealed oil deflector is disclosed which prevents leakage of oil from bearings of a rotating shaft and which prevents the ingestion of unfiltered atmospheric air which can lead to contaminant build-up and damage to the shaft. The air-sealed deflector includes an annular plenum surrounding the shaft and an annular feed slot interposed between the shaft and the plenum to fluidly interconnect the plenum with the chamber between at least two seal rings immediately adjacent the shaft. The plenum is adapted to receive a continuous flow of forced air from an air supply system including an air prime mover and means for filtering air drawn from the atmosphere which serves as the ultimate air source. The plenum being relatively large in volume, and having a cross-sectional area large with respect to the air feed conduit to the plenum, provides a very uniform source for air flow radially inward, in a sheet-like fashion, toward the shaft through the feed slot. The air-seal is formed as the sheet-like flow of air is released between working clearances between the shaft and the seal rings. A perforated diffuser ring mounted in the feed slot contributes to the desired pressure distribution and eliminates detrimental viscous drag effects.

11 Claims, 2 Drawing Figures

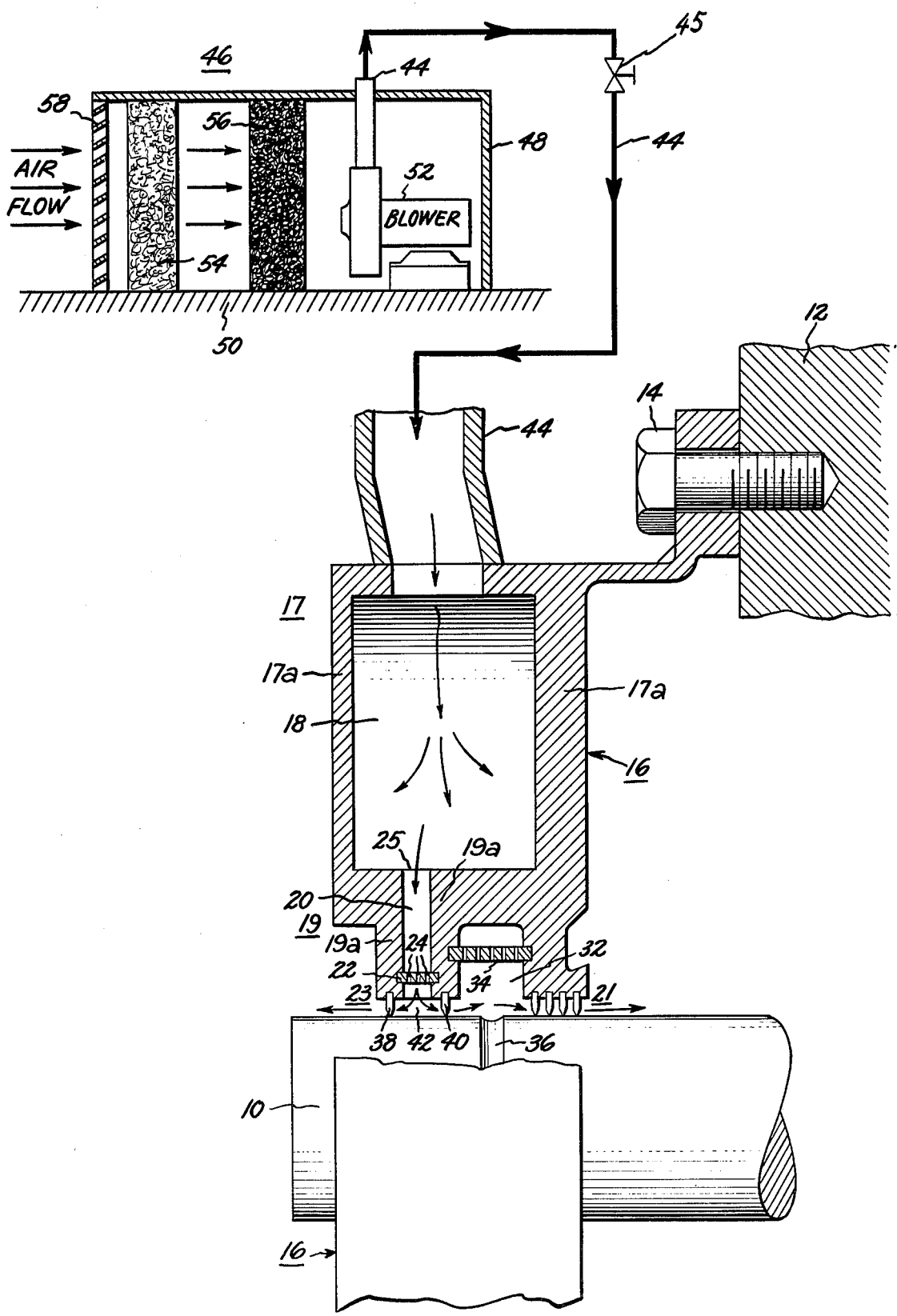

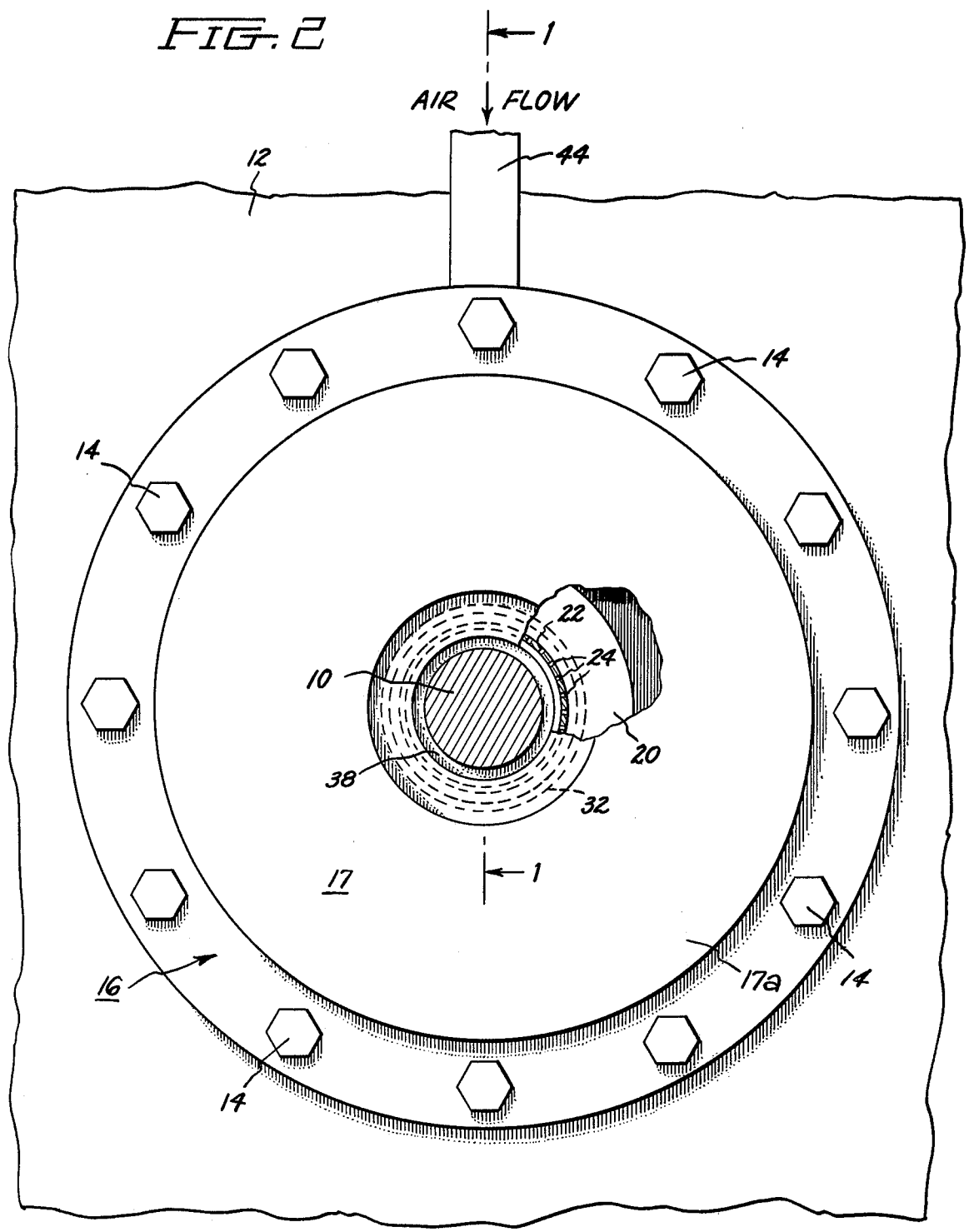

AIR-SEALED OIL DEFLECTOR

BACKGROUND OF THE INVENTION

This invention relates generally to the field of oil deflector seals for rotating shafts, and in particular to an air-sealed oil deflector that generates and maintains a uniformly distributed seal of filtered air around a rotating shaft to prevent ingestion and build-up of dirt in the oil deflector teeth.

A continual problem in operating large steam turbines has been that of dirt contamination of the bearing lubricating oil system. This contamination, if unchecked, is known to produce highly detrimental effects on bearing performance. Fossil fueled steam turbines are particularly subject to the problem since they frequently operate in an environment contaminated with coal dust and fly ash.

It has been found that contaminants enter the lubricating oil system primarily by being drawn in through the bearing oil seals along with the atmospheric air that is necessary for ventilation of the system oil tank and for oil seal cooling. The bearing oil seals, commonly referred to as oil deflectors, are labyrinth seal arrangements which prevent leakage of lubricating oil from the associated bearing. Contaminated air is drawn in through the seal by the lubricating oil system vacuum, entering through the clearances formed by the oil deflector rings (teeth) and the shaft. In a number of situations, contaminant ingestion has completely clogged the deflector teeth with the result that, in some severe instances, the dirt build-up has been carbonized by high temperatures to the point that shaft damage has occurred.

In the past, some effort has been made by workers in this particular field to seal labyrinth seals with a gaseous fluid under pressure. For example, steam seal systems, compressors, and other rotating equipment have been fitted with seals adapted to receive (and sometimes extract) a pressurized gas. These devices usually contain multiple cavities located along the shaft and use relatively small passages provided in the seal housing, or cavities, to inject the fluid into the tooth area. Because of the high air injection velocities required by these configurations, high pressure and correspondingly high flow horsepower are essential to effect a circumferential seal around the shaft. In some instances, there is some doubt as to whether or not a complete circumferential seal is established around the shaft.

It is, therefore, a principal object of the present invention to provide an air-sealed oil deflector which is capable of preventing ingestion and build-up of contaminants in the oil deflector teeth while allowing the deflector to maintain a high level of oil collecting and sealing performance.

It is a further object of the invention to provide an air-sealed oil deflector which is effective in forming a uniform circumferential seal around a rotating shaft without requiring excessive air pressure and flow, i.e., an air-sealed oil deflector operable without unduly high power consumption.

Still further objects and advantages of the invention will be apparent from the ensuing description.

SUMMARY OF THE INVENTION

In a preferred embodiment of the invention, an annular plenum, substantially concentric with a set of oil deflector rings around the shaft and disposed radially outward thereof, is supplied with a continuous flow of filtered air under pressure. The air, for example, may be supplied by a centrifugal blower. An annular feed slot also substantially concentric with the shaft and interposed between the deflector rings and the plenum, is fluidly connected along its outer circumference with the plenum to receive the continuous flow of air therefrom, and is fluidly connected along its inner circumference with the space, or chamber, between at least two rings of the set of deflector rings. The continuous flow of air is discharged from the plenum, through the feed slot, and out through the space between the two rings. The plenum is substantially greater in volume then the feed slot, and has a large cross-sectional area circumferentially transverse to the direction of pressure distribution. A flat, perforated diffuser ring is disposed within the feed slot so that air flowing through the slot must pass through the diffuser ring.

In operation, pressure in the plenum (created by the continuous in-flow of air) is very uniformly distributed throughout the plenum due to its relatively large volume, its large cross-sectional area perpendicular to the circumferential direction, and the absence of flow restrictions therein. Air flow from the plenum into the smaller volume feed slot is therefore evenly distributed in a continuous sheet-like stream directed radially inward toward the shaft. This sheet-like flow of air passes from the feed slot to be released between two of the deflector rings and then between the working clearance between the shaft and deflector rings to produce a uniformly distributed air-seal around the circumference of the shaft. A portion of the sealing air passes inward toward the bearing and the lubricating oil system; the remainder is released to the atmosphere.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 1 illustrates a preferred form of the invention partially in a cross-sectional view, partially in cut-away (with certain portions symmetrical about the shaft axis not specifically illustrated), and with the continuous air supply system shown schematically; and FIG. 2 is an end-view, including a partial cut-away, of a portion of the embodiment of FIG. 1 on a somewhat different scale, and in which line 1—1 indicates the cross-sectional view of FIG. 1.

DETAILED DESCRIPTION OF THE INVENTION

FIGS. 1 and 2 illustrate a preferred form of the invention suitable for use in combination with a large steam turbine to prevent leakage of bearing lubricating oil and to prevent the in-flow of unfiltered atmospheric air to the bearing lubricating oil system. For example, in the Figures, shaft 10 carries the rotating components of a steam turbine and is supported in turn by journal bearings (not specifically shown) located appropriately along its length. Shaft 10 is shown projecting from the end of the turbine with a portion of the bearing housing generally indicated at 12. The journal bearings, being continuously fed with lubricating oil, cause the portion of shaft 10 projecting from the bearing housing 12 to be continuously exposed to an oil laden environment.

Attached to the turbine, through bearing housing 12, such as by bolts 14, is an oil-deflector housing 16 which includes a radially outer section 17 and a radially inner section 19. The radially outer section 17 includes walls 17a defining an annular plenum 18, and the radially inner section 19 includes walls 19a defining an annular feed slot 20. Plenum 18 and feed slot 20 are in fluid communication with each other along a circumferential interface generally indicated at 25 in FIG. 1. Both the plenum 18 and the feed slot 20 are substantially concentric with the shaft 10 although plenum 18 is of substantially greater volume then feed slot 20. The plenum 18 has a cross-sectional area perpendicular to its circumferential direction that is relatively large with respect to conduit 44 (more fully discussed herein below). A perforated diffuser ring 22 bridges the feed slot 20 at a radially inner location near the shaft 10, preferably within the inner one-third of the feed slot 20. The diffuser ring 22, whose function will be more fully discussed herein below, has a large fraction (for example, 30%) of its surface area open to fluid flow such as through perforations 24. In FIG. 1, since the oil-deflector 16 is substantially symmetrical about the shaft 10, only an upper cross-sectional portion is illustrated.

The oil-deflector housing 16 further includes first and second sets of oil deflector rings, or teeth, 21 and 23 respectively, which form circumferential labyrinth seals around the shaft 10 to prevent the escape of oil. The radially inner tips of the individual deflector rings are in very close proximity to the surface of shaft 10 but with a working clearance between the shaft 10 and the individual teeth. The first set of deflector rings 21 is innermost, nearest the source of oil and substantially juxtaposed to the journal bearing being lubricated. Located between the first and second sets of deflector rings, 21 and 23 respectively, is an annular oil collection pocket 32 defined by walls in the inner section 19 of housing 16. A perforated ring 34 is mounted within the oil collection pocket 32 and is substantially concentric with shaft 10. Opposite the oil collection pocket 32, on the shaft 10, is an oil slinger groove 36 which traps any oil leaking past the first set of deflector rings 21 and which, with centrifugal force imparted by rotating shaft 10, throws the trapped oil outward into the oil collection pocket 32 from which it is drained through a connection in the lower portion of the housing 16.

The second set of deflector rings 23 includes an outer seal ring 38 and an inner seal ring 40 defining a space or chamber 42 therebetween which is fluidly connected to the feed slot 20.

Plenum 18 is connected by conduit 44 to an air supply system 46 illustrated schematically in FIG. 1. The air supply system 46 includes an enclosure 48 and a suitable mounting platform 50. Mounted upon the platform 50 and within the enclosure 48 are an electrical motor-operated blower 52 which is preferably a centrifugal blower; a coarse pre-filter 54 for trapping larger airborne particulates; and a final filter 56 which is capable of trapping very small sized particulate matter, preferably on the order of a few microns in diameter. Air is drawn into the enclosure 48 by blower 52 through filters 54 and 56 and through a grating 58 provided at one end of the enclosure 48. Prefilter 54 is thus located upstream of final filter 56.

In operation, atmospheric air is continuously drawn in through grating 58, through filters 54 and 56 for cleaning, and is then supplied in a continuous stream under pressure through conduit 44 to plenum 18. The prime mover for this continuous flow of forced air is blower 52 which imparts energy through pressurization of the stream of atmospheric air drawn in through the filters 54 and 56. Arrowed lines in FIG. 1 generally indicate the air flow path. A manually operated valve 45 in conduit 44 of FIG. 1 is utilized to regulate the rate of air flow into the plenum 18 and other series connected elements. Air entering the plenum 18 is immediately distributed in uniform pressure throughout, forming a uniform circumferential source of supply to the feed slot 20. The circumferential cross-sectional area of plenum 18 is sufficiently large to decrease the velocity of the entering air which aids in the uniformity of the pressure distribution. A substantially continuous sheet of air is thus directed radially inward through the feed slot 20 surrounding the shaft 10. This sheet of air passes through the holes 24 of diffuser ring 22 and is then uniformly discharged along the radially inner circumference of the feed slot 20 between the outer deflector ring 38 and the inner deflector ring 40. Finally, the sheet of air is turned 90° by the shaft 10 and is then released through the small working clearance between the shaft 10 and the deflector rings 38 and 40. There is thus provided a positive pressure, very uniform, circumferential air seal between the shaft 10 and deflector rings 38 and 40. A portion of the air released passes to the atmosphere; the balance flows inward through the second set of deflector rings 21 and is taken in to be discharged through the lubricating oil supply system. An advantage of the invention, in addition to positively sealing against the entry of unfiltered atmospheric air, is that the continuous flow of clean air provides cooling to both the seal and to any bearing lubricating oil which is in the oil deflector teeth, 21 and 23.

The perforated diffuser ring 22 contributes to the uniform pressure distribution in the plenum 18 and in the feed slot 20 by creating back-pressure in these chambers. Additionally, the diffuser ring 22 prevents radial pressure gradients within the plenum 18 and within the feed slot 20 by breaking up the growth of vortices created by viscous drag effects of the rotating shaft 10. The perforated ring 34, located in oil collection pocket 32, functions principally to release the viscous drag effects of the shaft 10 in the oil collection pocket 32 and to act as the principal oil collecting surface.

In tests of a preferred embodiment of the invention, a very high level of cleanliness in the oil-deflector has been achieved without requiring a burdensome level of flow horsepower, i.e., without requiring high rates of air flow at significantly high pressures. In addition, the oil collecting efficiency of an oil-deflector as described herein has been found to be quite high. Furthermore, the total air flow into the lubricating oil system is not increased significantly over that of prior art oil deflectors; thus the vapor extraction required for a lube oil system does not have significant added duty.

Thus while there has been shown and described what is considered a preferred embodiment of the invention, it is understood that various other modifications may be made therein. For example, although the uniform circumferential air seal described herein is developed by discharging a uniform sheet of air between two oil deflector rings, it will be apparent to those or ordinary skill in the art that additional deflector rings may be provided and that a continuous flow of air may be discharged from a feed slot to pass between a plurality of such oil deflector rings. Further, it will occur to those of ordinary skill in the art to provide a feed slot in the form of a segmented manifold rather than the unitary chamber as herein described. Still further, it will be recognized that the rotating turbine shaft 10 can be utilized, with suitable modifications or additions, to replace the blower 52 of FIG. 1 as a prime mover for the source of forced air feed to plenum 18. It is intended to claim all such modifications which fall within the true spirit and scope of the present invention.

The invention claimed is:

1. To prevent leakage of lubricating oil from bearings of a rotating shaft and to prevent the in-flow of unfiltered atmospheric air to the bearing lubricating oil system, an air-sealed oil deflector comprising:
   at least one set of oil deflector rings substantially concentric with the shaft and forming a labyrinth seal against lubricating oil flow;
   an annular plenum substantially concentric with said deflector rings and disposed radially outward thereof, said plenum being adapted to receive a continuous flow of forced air;
   an annular feed slot substantially concentric with said deflector rings and interposed between said deflector rings and said plenum, said feed slot being fluidly connected to said plenum to receive said continuous flow of forced air uniformly along the outer circumference of said feed slot and fluidly connected to discharge said continuous flow of forced air uniformly along the inner circumference thereof to pass radially inward toward the shaft between at least two rings of said deflector rings so that said continuous flow of air is released between the shaft and said at least two deflector rings to produce a uniformly distributed circumferential air seal.

2. The air-sealed oil deflector of claim 1 further including a perforated diffuser ring disposed within said feed slot so that said flow of air passing through said feed slot passes through said diffuser ring.

3. The air-sealed oil-deflector of claims 1 or 2 wherein said continuous flow of forced air is provided by an air supply system comprising:
   a prime mover for withdrawing from the atmosphere a stream of air and for imparting energy thereto to give rise to said flow of forced air; and
   filter means for removing substantially all particulate matter entrained within said stream of air.

4. The air-sealed oil deflector of claim 3 wherein said filter means comprises a pre-filter for removing coarser particulates entrained within said stream of air and a final filter for removing finer particulates entrained within said stream of air, said pre-filter and said final filter being fluidly connected in series within said air stream and with said pre-filter being disposed upstream of said final filter.

5. The air-sealed oil deflector of claim 4 wherein said plenum is substantially greater in volume than said feed slot and has a cross-sectional area transverse to the circumferential direction which is sufficiently large to cause a decrease in velocity of said continuous flow of forced air entering said plenum.

6. The air-sealed oil deflector of claim 1 wherein said at least two deflector rings are outermost from said bearing.

7. The air-sealed oil deflector of claim 6 wherein said prime mover comprises a centrifugal blower.

8. The air-sealed oil deflector of claim 7 wherein said perforated diffuser ring is disposed within the radially inner one-third of said feed slot.

9. For a steam turbine having a rotating shaft, an air-sealed oil deflector for preventing leakage of lubricating oil from a bearing providing support to the shaft and for preventing the in-flow of unfiltered atmospheric air to the bearing lubricating oil system, comprising:
   an oil-deflector housing encompassing said shaft at a location in juxtaposition to said bearing, said housing having a radially outer section and a radially inner section;
   an inner set of oil deflector rings substantially concentric with the shaft to form an inner labyrinth seal against oil leakage, said inner set of rings being proximate to said bearing along the axis of the shaft and being affixed to said inner section of said housing;
   an outer set of oil deflector rings substantially concentric with the shaft to form an outer labyrinth seal against oil leakage, said outer set of rings being spaced apart from said inner set of rings along the axis of the shaft and being affixed to said inner section of said housing;
   said outer section of said housing having walls defining an annular plenum outwardly concentric with said inner and outer sets of oil deflector rings, said plenum being adapted to receive a continuous flow of forced air;
   said inner section of said housing having walls defining an annular feed-slot interposed between said deflector rings and said plenum, said feed slot being fluidly connected to said plenum to receive said continuous flow of forced air uniformly along the outer circumference of said feed slot and fluidly connected to discharge said continuous flow of forced air uniformly along the inner circumference thereof to pass radially inward toward the shaft between at least two rings of said outer set of deflector rings; and
   a perforated diffuser ring disposed within said feed slot so that said flow of air passing therethrough passes through said perforated diffuser ring;
   whereby said continuous flow of air passing between said at least two rings of said outer set of deflector rings is caused to be released between the shaft and deflector rings to produce a uniformly distributed circumferential air seal.

10. The air-sealed oil deflector of claim 9 further including means interposed between said inner and said outer sets of oil deflector rings for trapping and removing oil leakage past said inner set of oil deflector rings, said means comprising:
    a circumferential groove within the surface of said shaft for gathering oil leakage along the surface of said shaft; and
    walls within said radially inner section of said housing defining an annular oil collection pocket in an encompassing relation with said groove to collect oil thrown outward by centrifugal force imparted by said shaft during rotation.

11. The air-sealed oil deflector of claim 9 or 10 further including means to supply said continuous flow of forced air, said means comprising:
    a prime mover for withdrawing from the atmosphere a stream of air and for imparting energy thereto to give rise to said flow of forced air; and
    filter means for removing substantially all particulate matter entrained within said stream of air.

* * * * *